United States Patent [19]

Winslow

[11] 3,773,224
[45] Nov. 20, 1973

[54] SEED DISPENSING WHEEL

[76] Inventor: James C. Winslow, 5257 Shore Dr., Carlsbad, Calif. 90008

[22] Filed: Oct. 14, 1971

[21] Appl. No.: 189,451

[52] U.S. Cl. .................... 222/139, 111/77, 111/80, 221/96, 222/177, 222/367
[51] Int. Cl. ............................................ A01c 15/00
[58] Field of Search .......................... 111/73, 77, 80; 221/96, 211; 222/177, 139, 367

[56] References Cited
UNITED STATES PATENTS

| 2,783,918 | 3/1957 | Bramblett .................... 221/211 UX |
| 3,343,507 | 9/1967 | Smith ..................................... 111/73 |

FOREIGN PATENTS OR APPLICATIONS

| 626,556 | 10/1961 | Italy ....................................... 111/77 |
| 937,979 | 12/1955 | Germany ............................... 111/77 |
| 1,211,014 | 2/1966 | Germany ............................... 111/77 |
| 1,285,143 | 1/1962 | France .................................. 111/77 |

Primary Examiner—Robert B. Reeves
Assistant Examiner—David A. Scherbel
Attorney—Forrest J. Lilly

[57] ABSTRACT

Apparatus for sequentially planting seeds at desired spaced loci in a row, usually at the bottom of a furrow. Includes means for depositing a mound of loose friable filler on top of each seed to ensure penetration of growth stalk to surface. In one form, seed planting wheel carries seed pickup ring which receives seeds from compartment, carries them through confined path and delivers them to radial channels for sequential deposit by gravity in furrow. A filler pocket is located laterally adjacent to each channel outer end and receives filler from filler compartment. Release means causes seed to drop in time sequence before releasing filler at same locus to overlie seed and provide yieldable cover for growth stalk. In variant, distributor means is belt with longitudinally spaced pairs of laterally adjacent holes therethrough. Belt passes under seed and filler compartments, picks up supplies and subsequently drops them in furrow. Same type of sequential release means causes seed to fall first and filler to fall on top of seed.

12 Claims, 13 Drawing Figures

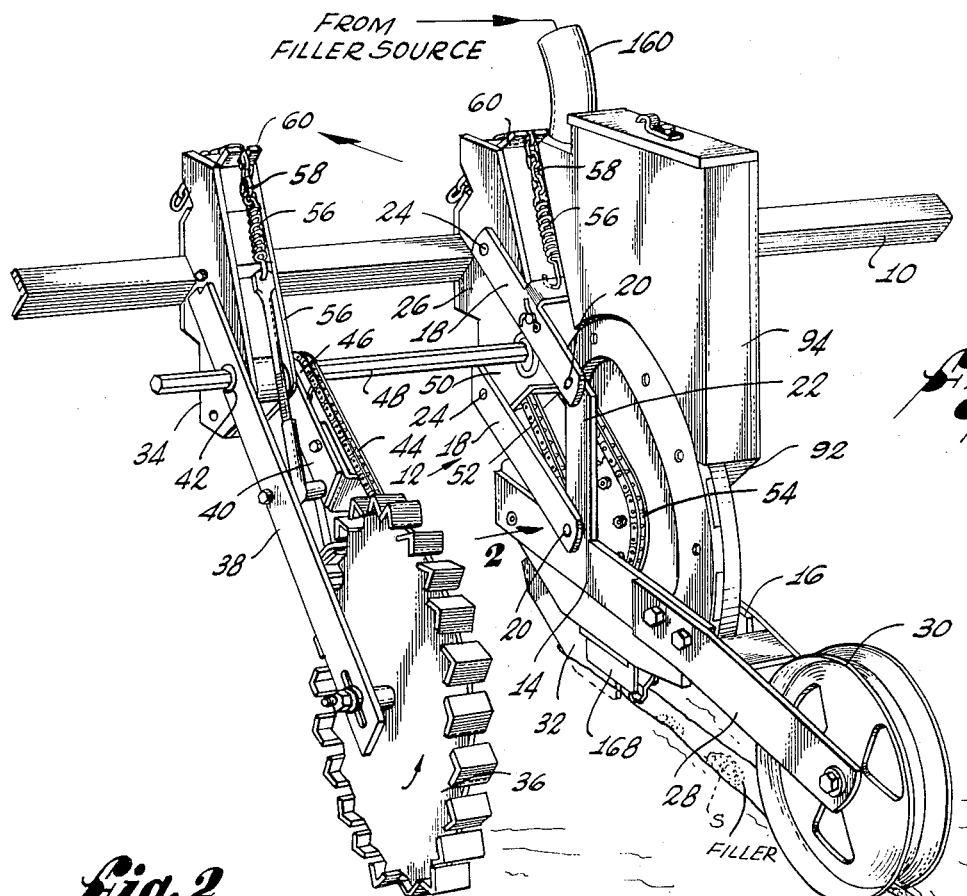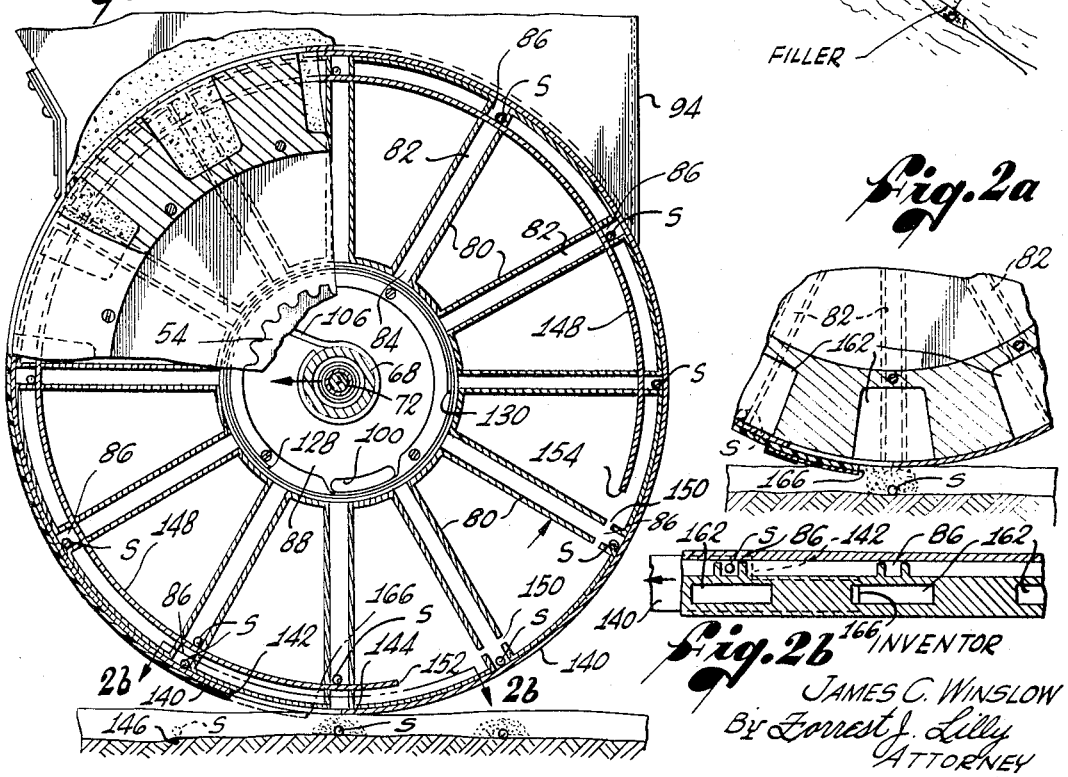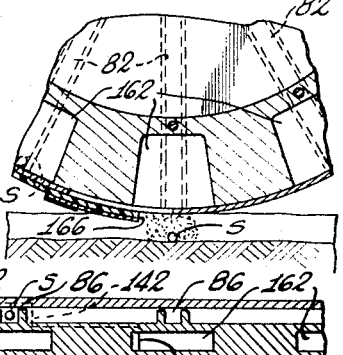

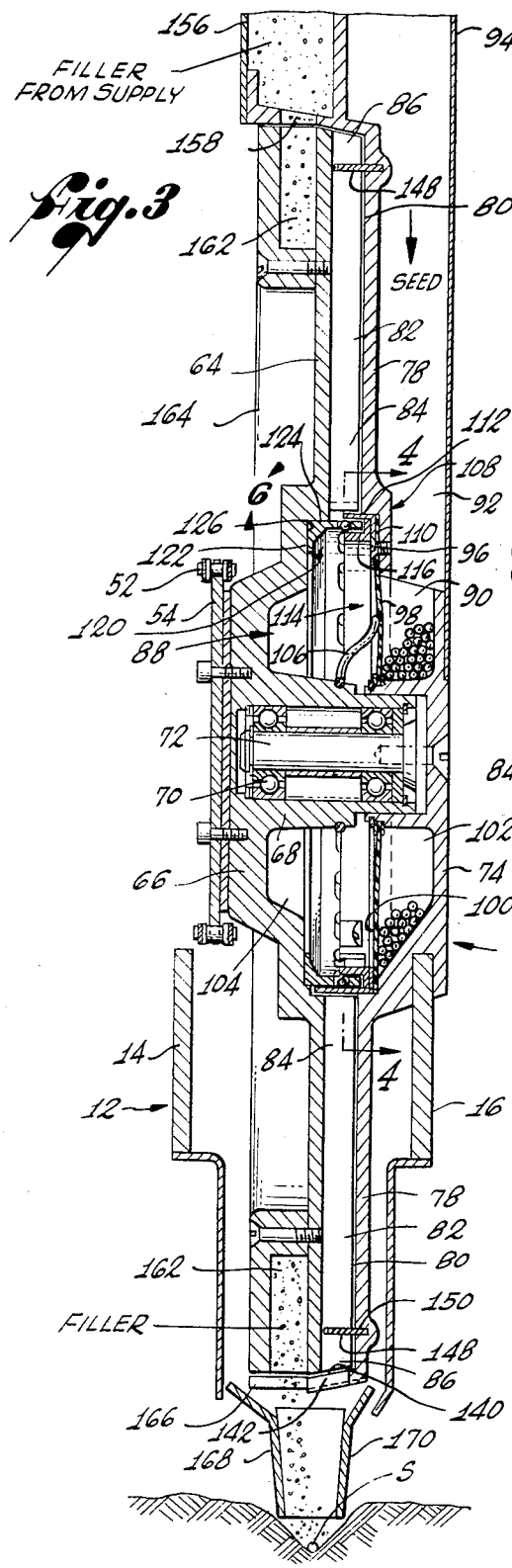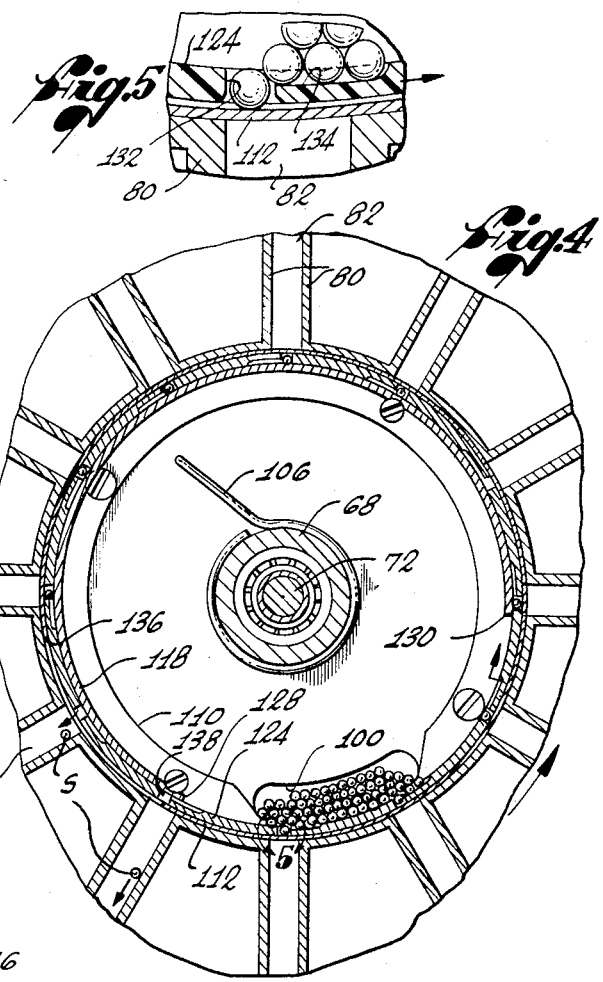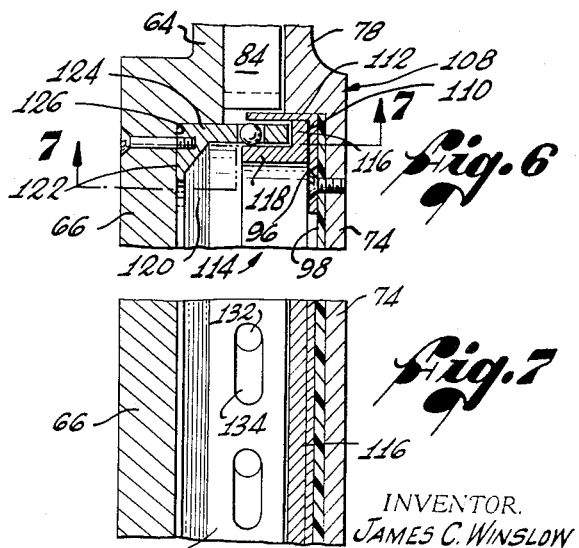

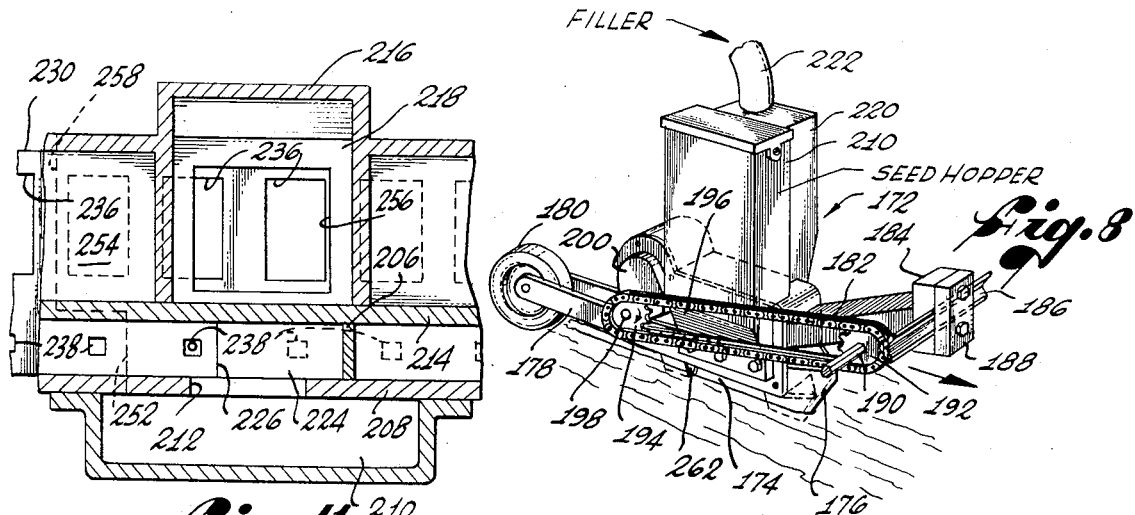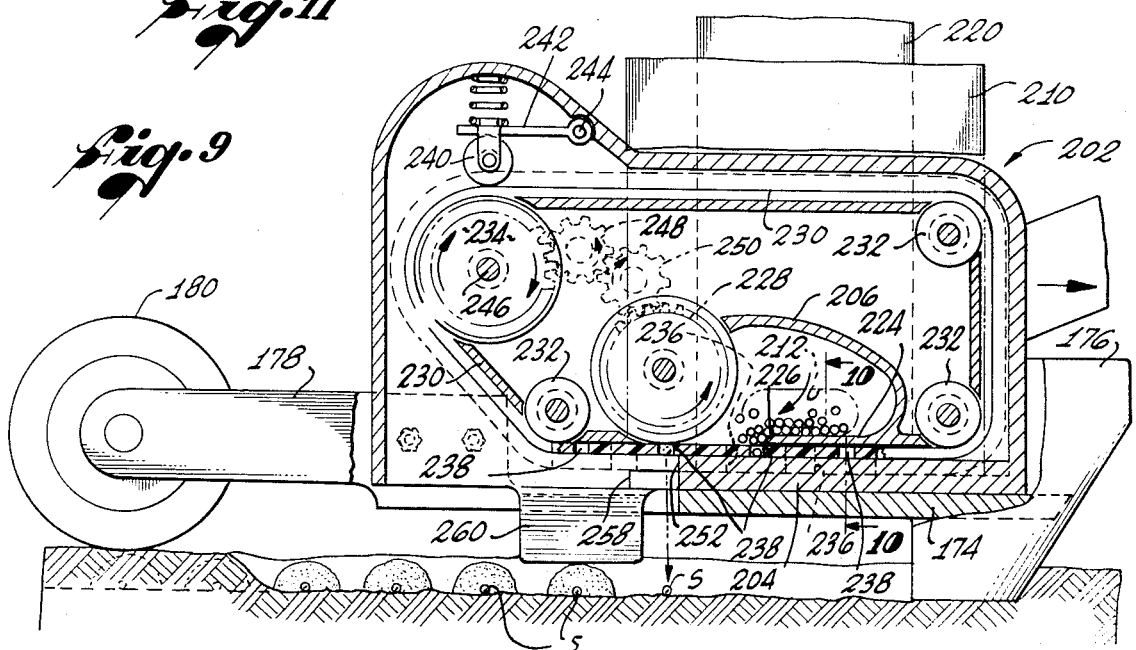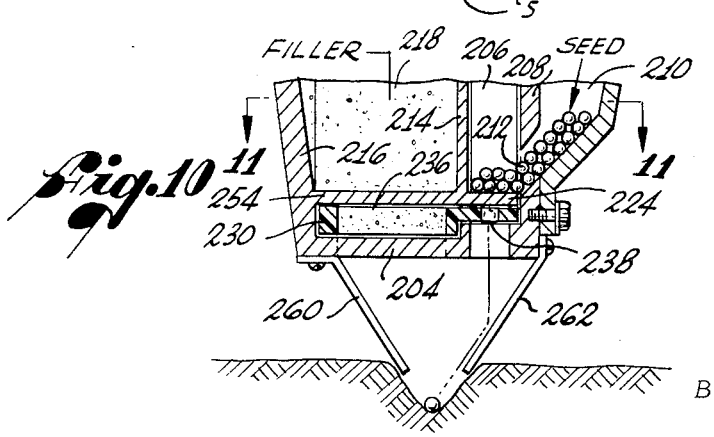

SEED DISPENSING WHEEL

BACKGROUND OF THE INVENTION

This invention lies in the field of apparatus for sequentially planting seeds at spaced loci along a predetermined path which is usually an existing furrow or a furrow which is formed just ahead of the planting device by a plow carried by the apparatus. It is particularly directed to means for ensuring the proper growth of new stalks regardless of the type of ground in which the seeds are planted as well as to means for more positively removing seeds from a supply and delivering them to every desired locus without fail.

There are at the present time various wheel-type planters and belt-type planters which select or receive one or more seeds at a time from a supply compartment and deliver them at spaced locations along a desired ground row such as a furrow. Most of these planters work reasonably well but they still leave something to be desired. Some tend to damage the seeds during selection and others often fail to pick up seeds consistently so that they leave "misses" along the row, which is very undesirable, or they may fail on both counts. Others are simply much more complicated than necessary to perform their function adequately, with resulting higher first cost and maintenance cost.

Some types of plants, such as celery, produce very delicate initial growth stalks which are easily broken or misdirected if they encounter any substantial obstacles in the covering soil. Adobe or clay-type soil tends to form a hard crust after being subjected to moisture, and weaker growth stalks cannot penetrate it to grow in a normal manner.

SUMMARY OF THE INVENTION

The present invention overcomes the various difficulties mentioned above and provides a mechanically simple apparatus for depositing undamaged seeds in the desired spacing and for protecting the initial growth of the seed stalks.

Generally stated, and in presently preferred forms, the total apparatus includes a support connected to the tool bar of a tractor to be drawn along a desired path, a trailing wheel to maintain the support at a desired level above the ground, a seed supply member and a filler supply member mounted on the support, and means to distribute the seed and filler at spaced loci on the ground. In the most preferred form, a seed planting wheel is rotatably mounted on a transverse axle on the support with a seed compartment surrounding the axle and provided with a relatively small passage in the lower portion to introduce a limited supply of seed to a pickup area. A seed pickup ring which rotates with the wheel traverses this area and receives seeds, preferably a single seed, in a series of circumferentially spaced receptacles and carries them in a confined path through the upper half of its path of revolution. This path is then open sequentially to a series of radially extending channels, each aligned with one of the receptacles, allowing each successive seed to fall by gravity into the inner end of the associated channel through which it passes to the circumferential margin of the wheel to fall by gravity to the ground, preferably in the bottom of a furrow.

Shield means surrounds the wheel and covers the outer ends of the channels to retain the seeds in place and is cut away through a predetermined sector in the lower portion to release each seed sequentially. In operation, the shield means is fixed with respect to the support and travels forward at the speed of the towing vehicle while the wheel is rotated in such manner that the forward portion travels downward and rearward with respect to the support and shield at a rate corresponding to the forward speed of the support so that the ground speed of the outer end of each channel is substantially zero during close approach to the ground, and each seed is deposited by gravity with little or no horizontal component of movement.

It has been determined that initial vertical growth of the seed stalks can be protected by depositing on top of each seed a mound of filler which allows moisture to reach the seed but which offers no appreciable resistance to the vertical thrust of a growing seed stalk. Such a loose friable filler may be any particulate material having low enough cohesion to part readily in response to the force of a growing stalk and may be fibrous or granular. One material which is particularly suitable is vermiculite. The mound should be high enough to maintain a yieldable path to ground level even if some soil is pushed in around it laterally.

To accomplish this function, a series of filler pockets are provided around the circumference of the wheel, one for each channel, and located laterally adjacent to the outer end of its associated channel. While the filler pockets may be mounted on a separate wheel or disk, it is preferred to secure them directly to the seed planting wheel. A filler supply compartment is mounted above the upper pass of the pockets to fill each one by gravity as they travel under the compartment, and shield means is provided to cover the pockets as they descend through the forward portion of their travel. The shield means is open in the lower portion to allow each pocket to sequentially drop its contents to the ground. The opening for the filler is staggered aft of the opening for the seed so that each seed is deposited on the ground before the filler pocket is uncovered, and thus the filler is always deposited on top of the seed. The filler pocket is large enough to extend fore and aft of its associated channel and hence the mound of filler will extend fore and aft of the covered seed.

In a modified form a belt is substituted for the wheel and is trained about a series of pulleys to travel in a vertical plane which is perpendicular to the plane of the belt itself. The belt is provided with a series of spaced pairs of laterally adjacent apertures through its thickness, and its lower pass which is substantially horizontal extends under a seed compartment and a filler compartment arranged side by side and all mounted within a box-like enclosure. Shield means extend horizontally under the belt to support it and to cover the outlet ends of the apertures. As the belt travels rearward with respect to the enclosure and support, seeds fall into the seed apertures and filler falls into the filler apertures. The shield means is configured similarly to the shield means of the form first described and, as the belt continues to move relatively rearward, the shield first releases a seed from an aperture and subsequently releases filler from the associated aperture to cover the seed.

BRIEF DESCRIPTION OF THE DRAWINGS

Various other advantages and features of novelty will become apparent as the description proceeds in conjunction with the accompanying drawings, in which:

FIG. 1 is a schematic perspective view showing the total apparatus of the invention hitched to the tool bar of a towing tractor, not shown;

FIG. 2 is a schematic vertical sectional view of the seed planting wheel of the preferred form of the invention;

FIG. 2a is an enlarged detail view of a fragmentary lower portion of FIG. 2;

FIG. 2b is a schematic plan view taken on line 2b—2b of FIG. 2;

FIG. 3 is a schematic transverse vertical sectional view through the apparatus of the preferred form;

FIG. 4 is a detailed sectional view taken on line 4—4 of FIG. 3;

FIG. 5 is an enlarged detail of section 5 of FIG. 4;

FIG. 6 is an enlarged detail of section 6 of FIG. 3;

FIG. 7 is a sectional view taken on line 7—7 of FIG. 6;

FIG. 8 is a schematic perspective view similar to FIG. 1 of a modified form of the invention;

FIG. 9 is a schematic vertical sectional view through the device of FIG. 8;

FIG. 10 is a sectional view taken on line 10—10 of FIG. 9; and

FIG. 11 is a sectional view taken on line 11—11 of FIG. 10.

DESCRIPTION OF PREFERRED EMBODIMENTS

A typical seed planting machine incorporating the apparatus of the invention in one form is illustrated schematically in FIG. 1, in which a conventional tow bar or tool bar 10 is attached to a tractor, not shown, for drawing the planting apparatus across the ground. A support 12, including frame members 14 and 16, is attached to the tow bar by means of parallelogram links 18, pivoted at 20 to arm 22 and at 24 to bracket 26 which is secured to the tool bar by a conventional clamp, not shown. With this connection the apparatus may rise and fall vertically without change in attitude. A trailing frame extension 28 carries at its aft end a wheel 30 which supports the apparatus at a desired level about the ground. Its V-shaped rim may also serve as a limited furrow closer as indicated to compact the furrow made by plow 32.

A second bracket 34, also attached to the tool bar, carries a cleated ground engaging wheel 36 by means of support arms 38 and 40 pivoted to the bracket at 42. The wheel 36 is driven by its engagement with the ground, and a sprocket, not shown, carried by the wheel drives chain 44 which engages sprocket 46 on drive shaft 48, causing rotation of the latter. The right end of the shaft, as seen in this figure, enters casing 50 and carries a second sprocket to drive chain 52. The chain engages sprocket 54 to drive the seed planting wheel which is described hereinafter. The ground pressure of wheels 30 and 36 may be adjusted by means of tension springs 56 connected by means of chains 58 to notched anchorages 60 on the brackets. To reduce ground pressure it is only necessary to pull the chains to a higher level and slip their adjacent links into the notches of the anchorages.

Considering FIGS. 2 and 3 together, it will be seen that the seed planting wheel 62 includes a disk-like radially outer portion 64 and a dished hub 66 having a central boss 68 mounted by bearings 70 for rotation on transverse axle 72. The latter is rigidly connected to the dished hub 74 of an annular plate 76 having a disk-like outer portion 78 of approximately the same diameter as wheel 62. Hub 74 is rigidly connected to frame member 16 of support 12 to carry all of the components of the planting apparatus. Sprocket 54 is rigidly attached to hub 66 to rotate the planting wheel 62 in response to movement of the chain 52. The sizes of the various sprockets are so chosen that rotation of driven wheel 36 will cause rotation of seed planting wheel 62 at a rate corresponding very closely to the speed of the towing vehicle. With this relation, as any given forward sector of the wheel moves downward and rearward with respect to the support, it will have substantially zero ground speed during its close approach to the ground, and consequently a seed can be dropped very accurately into a furrow with little or no horizontal component of motion.

The seed distributor means includes a plurality of pairs of radially extending ribs 80, each pair defining a channel 82 having its inner end 84 adjacent to the margin of hub 66 and its outer end 86 adjacent to the margin of disk 64. The open faces of the channels are covered by the inner face of disk 78 to complete their conduit configuration. The clearance between the edges of the rotating channels and the stationary disk is maintained small enough to prevent escape of any size seed that is being handled.

The dished hub 74 is generally similar in form to hub 66, and between them they define a generally annular enclosure 88 surrounding boss 68 and axle 72. The upper portion of hub 74 is cut away to form an entry port 90 communicating with and connected to the lower end 92 of seed hopper 94 which forms a passage for seed to drop by gravity into hub 74. The hub is provided with a planar annular spot face 96 to which a diaphragm 98 is attached by any suitable means to divide enclosure 88 diametrically into right and left compartments as viewed in FIG. 3. A small elongate aperture 100 is formed in a lower sector of the diaphragm to open communication between compartments 102 and 104 and allow a limited quantity of seeds to flow from the major supply in 102 to the working supply in 104.

Diaphragm 98 is somewhat elastic and preferably composed of a rubberized fabric. A diaphragm vibrator 106 is provided in the form of a resilient wire arm mounted on hub 68 to rotate therewith. The tip of the arm locally deflects portions of the diaphragm along its circular path of movement. This maintains the diaphragm in vibratory motion and prevents the major supply of seed from bridging and hanging up.

The portion of the distributor means which receives or extracts individual seeds from the working supply in seed compartment 104 and transfers them to channels 82 for delivery to the ground includes three cooperating rings. A first, outer seed retainer ring 108 has an angle cross section with an annular planar face 110 secured to spot face 96 and overlying the margin of diaphragm 98 and a cylindrical flange 112 extending from the margin of face 110. The inner ends 84 of channels 82 rotate in closely spaced relation to the outer face of flange 112. A second, inner seed retainer ring 114 also has an angle cross section with an annular planar face 116 overlying face 110 and also secured to spot face 96, and a cylindrical flange 118 extending from the margin of face 116. Ring 114 is so dimensioned with respect to ring 108 that flange 112 is spaced a predetermined distance radially outward of flange 118 to define between them a cylindrical confinged path of travel.

The seed pickup ring 120 is also generally of angle section with a planar face 122 carrying a cylindrical flange 124. The inner wall of hub 66 has an annular spot face 126 to which ring 120 is secured for rotation with the hub. Flange 124 of the pickup ring extends axially toward the retainer rings and into the confined path of travel with just sufficient radial clearance to rotate freely.

As will be noted in FIG. 3, a small quantity of seeds from the major supply will pass through aperture 100 in the diaphragm and form a mound in the bottom of seed compartment 104. This mound is shown in FIG. 4 as being slightly off center in the counter clockwise direction of rotation of the seed planting wheel 62 as viewed in this figure. The flange 118 is cut away from point 128 shortly before bottom center to point 130 which is at about the level of the axle 72, so that flange 124 of the pickup ring is exposed throughout this sector and in direct contact with the seeds. The flange 124 is provided at spaced points about its circumference with seed receptacles 132 in the form of apertures extending through its thickness and approximately at the center of the width of the flange. Each receptacle is radially in line with the inner end 84 of an associated channel 82. As best seen in FIG. 5, an elongate shallow groove or depression 134 is formed in the inner face of the flange to receive and guide a few seeds toward the receptacle, the groove extending forward of the receptacle in the direction of rotation.

As the wheel and flange 124 rotate in the indicated direction, the flange moves under the seeds for a short distance, allowing seeds to fall into each of the receptacles aided by the presence of other seeds in the grooves. As flange 124 rises toward point 130, the excess seeds fall away and return to the mound. If any excess seed happens to remain in a groove, it will be knocked away by contact with the inner retainer ring at point 130. When a receptacle passes point 130 it is confined between the inner and outer retainer rings for a distance of about one-half of a circumference and the seed is retained in the receptacle. The flange 112 is cut away from point 136 to point 138 throughout a predetermined sector. In this sector there is no restraint against outward movement of a seed and it falls by gravity into the open inner end 84 of the associated channel 82 which is always in registry with its receptacle. From this point the seed travels to the outer end 86 of the channel to be deposited in a furrow.

It will be seen in FIGS. 2 and 3 that shield means in the form of a flange 140 on disk 78 extends substantially completely around the open outer ends of channels 82 effectively closing them against premature egress of the seeds S. However, flange 140 is cut away in a lower portion throughout a sector extending from a trailing edge 142 to point 144. Since the trailing edge moves forward with the tractor while the seed pocket 86 has substantially zero ground speed as previously explained, the pocket merely moves down toward the ground while trailing edge moves forward past it to uncover the pocket and allow seed S to fall to the ground at point 146. Since it has practically no component of horizontal movement, it will be deposited accurately and remain in place. As the wheel effectively rolls forward just above the ground, each seed will be sequentially deposited at equal distances corresponding to the circumferential distances between seed pockets 86.

At low planting speeds, each seed will reach its seed pocket 86 in time to be discharged by passage of trailing edge 142. However, at higher speeds such as 3 or 4 miles per hour the time lapse becomes marginal and it is desirable to provide an extra revolution for the seed travel. To accomplish this, an annular seed guard 148 is provided and is secured to disk 78 near its outer margin. Ribs 80 are cut away at 150 to allow the guard to extend across the channels and intercept the seeds. In FIG. 2 it will be seen that the guard is cut away through a sector from point 152 to point 154. As the channels travel downward the seeds fall into contact with the guard. As the channels begin their upward swing, they reach the cutaway point 152 and the seeds fall to seed pockets 86. When the seed pockets pass point 154 the seeds are trapped and remain in the pockets until the latter have rotated to point 142 where they are released.

As outlined above, it is highly desirable to deposit a mound of loose, friable filler directly on top of each seed of any type of plant which has a weak initial seed stalk. The mound should reach about to ground level and extend fore and aft of the seed so that if some soil is pushed in around the mound there will still be a readily penetrable mass of material in the vertical growth path. To accomplish this function, the present invention provides a source of supply of a suitable filler, such as vermiculite, and means to deposit a mound of filler directly on top of each deposited seed.

As illustrated in FIGS. 2 and 3, a filler compartment 156 is provided above the level of the seed planting wheel 62 and may share a common wall with the seed hopper 94. The compartment is provided with an aperture 158 for gravity flow of the filler and may be fed through a conduit 160 from a major supply hopper, not shown. A circumferential series of filler pockets 162 are disposed about the circumference of the seed planting wheel with each filler pocket laterally adjacent to an associated seed pocket 86. They may be supported directly from hub 66 by means of spokes but preferably they are formed in a continuous ring 164 which is secured to disk 64 of the wheel 62. Ring 164 is imperforate along its outer face between the spaced pockets.

As wheel 62 and ring 164 rotate, the pockets 162 sequentially pass beneath the filler compartment 156 and are loaded by gravity. As they approach the ground, as seen in FIG. 2, they exhibit the same characteristic of substantially zero ground speed as the seed pockets. Each filler pocket is, of course, much larger in volume than its associated seed pocket and it extends a substantial distance circumferentially fore and aft of it. Since the seed must lie on the bottom of the furrow in contact with the soil for best germination results, with the filler on top of it, and yet the filler pocket is laterally adjacent to the seed pocket, means must be provided to establish a time sequence of deposit. While separate shield means may be used, it is preferred to extend flange 140 laterally to cover the filler pockets also, as seen in FIG. 3. The added portion of the flange is cut away to form a trailing edge 166 which is staggered rearward of trailing edge 142 with respect to the direction of travel of the apparatus. Considering FIGS. 2, 2a and 2b, the margins of wheel 62 and ring 164 may be regarded as an elongate strip lying stationary just above the ground with flange 140 as another strip moving forward beneath it. Trailing edge 142 will pass any given seed pocket 86 and release the seed at about the time the trailing edge 166 reaches the nearest margin of the associated filler pocket 162. As it traverses the pocket it gradually releases the filler from a point behind the seed to a point beyond it, thus producing a mound which is centered over the seed. It cannot be deposited in any other place because the pockets are effectively stationary during the operation.

Guide plates 168 and 170 may be provided to direct the contents of the laterally spaced pockets toward the center of the furrow. The V-shaped rim of wheel 30 is shaped and dimensioned so that it will not tightly close the furrow as in the usual case but merely urge the soil slightly back toward the center line to leave the mounds exposed as indicated in FIG. 1.

A modified form of the apparatus described above is illustrated in FIGS. 8 to 11, wherein the planter 172 includes a support frame 174 carrying a plow 176 at the forward end and frame extension 178 extending aft and mounting a support and compacting wheel 180. The frame is connected by a pair of parallelogram bars 182 to a bracket 184 which in turn is connected to tool bar 186 by a clamp plate 188. Drive shaft 190 is connected by a sprocket and chain to a ground driven wheel in the same manner as in the form previously described, and sprocket 192 drives sprocket 194 through chain 196. Sprocket 194 is connected to shaft 198 which extends into gear box 200 to drive the components of the apparatus.

The planting apparatus is housed in a box-like enclosure 202 having a bottom plate 204 lying closely above the surface of the ground over the furrow made by plow 176. Within the enclosure is a small partially closed seed compartment 206 adjacent to a side wall 208 of the enclosure, on the other side of which is seed hopper 210. An aperture 212 in wall 208 permits the flow of a small quantity of seeds from the hopper into compartment 206. A partition 214 defines with side wall 216 of the enclosure a second, filler compartment 218 surmounted by filler hopper 220, which is fed by conduit 222 from a major filler supply hopper, not shown. Compartment 206 has a bottom wall 224 which terminates at point 226 and its open aft end is blocked by roller 228.

The seed and filler distributor means comprises a belt 230 trained over idler pulleys 232 and drive pulley 234 to travel within the enclosure through a path in a generally vertical plane, the path including a lower pass in which the belt travels rearwardly in the horizontal plane of its width directly beneath compartments 206 and 218 and directly above bottom wall 204 of the enclosure which serves as a shield means as well as a support for the belt. The means for extracting seeds and measured amounts of filler from the compartments and delivering them to the proper spaced loci on the ground includes a plurality of longitudinally spaced pairs of apertures 236 and 238 through the thickness of the belt to serve as seed pockets and filler pockets. As will be seen in FIG. 10, the filler side of the belt is thicker than the seed side, and pocket 236 is much larger in area than pocket 238. Pocket 236 is also longer fore and aft than pocket 238 to distribute filler fore and aft of each deposited seed.

In operation, pulley 234 drives the belt in the direction shown; i.e., forward in the upper pass, then downward and rearward in the lower pass and back up to pulley 234. Spring biased roller 240, mounted on arm 242 which is pivoted to the enclosure at 244, helps to maintain belt 230 in good driving contact with pulley 234. The pulley is mounted on drive shaft 246 which may be connected directly or through gears to shaft 198 and thence to the ground driven wheel, the drive ratios being so selected that the belt 230 will travel rearward in the lower pass with respect to the support at the same rate that the support travels forward with respect to the ground. The result, as with the first form, will be that the lower pass is substantially stationary, with the entire closure and the compartments moving forward.

Thus, as a given seed pocket 238 passes relatively rearward under wall 224 beyond trailing edge 226, the seeds in compartment 206 will be in contact with the upper surface and a seed will fall into the pocket. Continued relative rearward movement will bring this particular pocket under roller 228 which is driven in counter clockwise rotation by drive pulley 234 through idler gears 248 and 250. Roller 228 is provided with a soft surface such as elastomeric material or preferably brush bristles so that it will sweep the excess seeds away from the surface of the belt without damaging the seeds. That portion of the shield means 204 which underlies the seed carrying portion of the belt is terminated to form a trailing edge 252. As each successive seed pocket passes this trailing edge it is uncovered and the seed falls to the ground.

The filler portion of the belt passes under floor 254 of the filler compartment 218 and each successive filler pocket 236 is filled by gravity from compartment 218 through aperture 256 in floor 254. As the pocket moves relatively rearward it will pass the termination or trailing edge 258 of the portion of shield means 204 which underlies the filler portion of the belt. At this point the pocket 236 is uncovered and the filler falls to the ground on top of the seed, covering it both laterally and fore and aft. Since the belt is effeceively stationary as pointed out above, the trailing edge 252 first releases the seed and the trailing edge 258, which is staggered aft of trailing edge 252, then releases the filler in a time sequence. Thus the planting operation is carried out in the same way as in the first form of the invention. Guide plates 260 and 262 may be provided to direct the seed and filler into the center of the furrow.

I claim:

1. Seed planting apparatus comprising:
   a support movable in a forward direction along the ground for traversing a selected path to be planted;
   a seed compartment mounted on the support for holding a supply of seeds;
   a filler compartment mounted on the support for holding a supply of loose, friable filler;
   seed distributor means for sequentially removing seeds from the seed compartment and sequentially delivering them to spaced loci on the ground along the bottom of a furrow coinciding with the selected path;
   filler distributor means for sequentially removing measured quantities of filler from the filler compartment and sequentially delivering them to the same spaced loci on the ground and on top of the seeds;
   the seed distributor means including a plurality of seed pockets spaced along its periphery with outlets opening externally to deliver the seeds;

the filler distributor means including a plurality of filler pockets spaced along its periphery with outlets opening externally to deliver the filler;

the two distributor means being juxtaposed throughout, and each filler pocket being located laterally of and adjacent to its associated seed pocket;

drive means operative upon forward movement of the support to move successive portions of the peripheries of the two distributor means downward toward the ground and rearward with respect to the support at substantially the same rate as the forward ground speed of the support to produce substantially zero ground speed of each seed pocket and filler pocket during the period when they are at their closest approach to the ground;

shield means carried by the support and moving forward at the same ground speed as the support, and adapted to block the outlets of the pockets throughout a portion of their path of movement;

the shield means having configurations adapted to uncover the pockets sequentially during their close approach to the ground and to act in time sequence to first release a seed from its seed pocket to fall to the ground and to then release the filler from the associated filler pocket to fall to the ground and form a mound on top of the seed.

2. Apparatus as claimed in claim 1;

the outlet of each filler pocket extending peripherally fore and aft of the outlet of its associated seed pocket to cause the mound of filler to extend fore and aft of the deposited seed.

3. Apparatus as claimed in claim 2;

the configuration of a first portion of the shield means comprising a seed release opening defined in part by a first trailing edge;

the configuration of a second portion of the shield means comprising a filler release opening defined in part by a second trailing edge;

the first trailing edge being located a fixed, predetermined distance forward of the second trailing edge to substantially uncover a given seed pocket outlet before the second trailing edge reaches the outlet of the associated filler pocket during forward movement of the shield means relative to the seed pocket and the filler pocket.

4. Apparatus as claimed in claim 1;

in which the outlets of both the seed pockets and the filler pockets open on the peripherally outer faces of the distributor means.

5. Apparatus as claimed in claim 1;

the receiving portions of each of the distributor means passing under their respective supply compartments to receive the seeds and the filler by gravity.

6. Apparatus as claimed in claim 1;

the support comprising a generally box-like enclosure;

the seed compartment and the filler compartment being located side-by-side within the enclosure;

the distributor means comprising an endless loop belt;

guide means to support the belt in a path of travel in a generally vertical plane within the enclosure with the lower pass of the belt traveling horizontally beneath the supply compartments;

the belt being provided with a series of spaced pairs of side-by-side openings therethrough to define associated seed and filler pockets to receive seed and filler from the compartments;

and the bottom wall of the enclosure extending horizontally fore and aft beneath the belt to support the belt and to constitute the shield means for the pockets;

the bottom wall terminating rearwardly in a pair of longitudinally staggered laterally extending trailing edges;

the forward trailing edge serving to release the seeds from their pockets and the aft trailing edge serving to release the filler from its pockets;

the relative forward movement of the shield means causing the seeds and filler to be dropped sequentially.

7. Apparatus as claimed in claim 1, the seed distributor means comprising a seed planting wheel with seed pockets spaced along its circumference and having a hub mounted for rotation on a transverse axle;

the seed compartment being located adjacent to the hub;

a plurality of seed transporting channels extending from the compartment to the seed pockets;

and means movable with the seed planting wheel to remove seeds from the seed compartment and transfer them to the channels for delivery to the seed pockets;

the filler distributor means comprising a filler wheel with filler pockets spaced along its circumference and opening radially outwardly;

the filler compartment being located above the filler wheel to fill the pockets by gravity;

the shield means being arcuate and overlying the pockets at the forward portion of the wheels;

the first portion of the shield means overlying the seed pockets terminating in a first trailing edge forward of the vertical plane containing the axle to release the seed from each seed pocket during the last portion of its downward movement;

and the second portion of the shield means overlying the filler pockets terminating in a second trailing edge spaced aft of the first trailing edge to subsequently release the filler from the associated pocket to fall on top of the deposited seed.

8. Seed planting apparatus comprising:

a seed planting wheel having a hub mounted for rotation on a transverse axle in a predetermined direction;

an annular seed compartment surrounding the hub and defined by a stationary cylindrical inner seed retainer ring;

means to supply a quantity of seeds to the lower part of the seed compartment;

a stationary cylindrical outer seed retainer ring surrounding the inner ring and adially spaced therefrom to define between them a path of travel;

the wheel including a plurality of channels connected to the hub for rotation therewith and extending radially from the outer retainer ring to the circumference of the wheel to transport seeds thereto;

a cylindrical seed pickup ring also connected to the hub for rotation therewith and sized to travel in the path between the inner and outer retainer rings, and provided around its circumference with a plurality of seed receptacles in the form of apertures extending radially through its thickness;

the inner retainer ring being cut away at its lower portion and forward portion, in the direction of rotation of the wheel, through a predetermined sector to provide access for seeds to enter the receptacles by gravity;

the outer retainer ring being cut away through a predetermined sector commencing about one-half of the circumference beyond the end of the cutaway sector of the inner retainer ring to provide access for seeds to enter by gravity into the inner ends of the channels for delivery to the circumference of the wheel;

the pickup ring fitting with limited clearance between the retainer rings to confine the seeds in the receptacles during the upper portion of the travel of the pickup ring;

stationary circumferential shield means surrounding substantially the entire circumference of the wheel and overlying the outer ends of the channels to retain the seeds in the channels;

the shield means being cut away throughout a predetermined limited sector of its lower portion to uncover the outer ends of the channels and permit the seeds to be sequentially dropped by gravity at spaced loci along a furrow;

a filler pocket associated with each channel and located laterally adjacent to its outer end and moving in unison therewith;

a filler supply compartment located above the path of travel of the filler pockets to load them by gravity;

and the shield means also extending circumferentially about the open ends of the filler pockets and being cut away throughout a predetermined sector of its lower portion to uncover the filler pockets and permit the filler to be sequentially dropped by gravity from successive pockets;

the cutaway sector of the shield means overlying the filler pockets being circumferentially staggered from the cutaway sector overlying the channel ends in such direction that the shield means will uncover a channel end to drop a seed before it uncovers the associated filler pocket to drop the filler on the seed.

9. Apparatus as claimed in claim 8;
the outlet of each filler pocket extending peripherally fore and aft of the outlet of its associated channel end to cause the dropped filler to form a mound on top of the deposited seed and extending fore and aft of the seed.

10. Seed planting apparatus comprising:
a seed planting wheel in the general form of a disk having a hub mounted for rotation on a transverse axle in a predetermined direction;

a seed compartment adjacent to the hub;

radially extending channels on a first face of the radially outer portion of the disk having inner ends passing adjacent to the seed compartment and outer ends at the circumferential margin of the disk;

means to transfer seeds from the seed compartment to the channels for delivery to the margin of the disk;

a plurality of filler pockets on the second face of the disk at its margin;

each filler pocket being located laterally adjacent to an associated channel;

a filler compartment located above the path of travel of the filler pockets to load them by gravity.

and means to retain the seeds and filler in the channels and pockets during selected periods of rotation of the disk and to discharge them sequentially at spaced loci along the ground.

11. Apparatus as claimed in claim 10;
including a ring at the margin of the disk and secured to the second face thereof;
the filler pockets being formed in the ring.

12. Apparatus as claimed in claim 10;
including a stationary second disk connected to the axle and arranged in juxtaposition to the first named disk to define betweem them the seed compartment;

and the means to retain and discharge the seeds and filler comprising shield means connected to the margin of the second disk and extending circumferentially around the open ends of the seed channels and the filler pockets;

the shield means having circumferentially staggered openings in the portions overlying the seed channels and the filler pockets to produce sequential release of the contents.

* * * * *